United States Patent [19]
Hiramatsu et al.

[11] Patent Number: 6,167,350
[45] Date of Patent: Dec. 26, 2000

[54] METHOD AND APPARATUS FOR SELECTING INFORMATION SIGNAL RANGE AND EDITING APPARATUS FOR INFORMATION SIGNAL

[75] Inventors: Akihiko Hiramatsu; Toshiyuki Yamazaki, both of Tokyo, Japan

[73] Assignee: Sony Corporation, Tokyo, Japan

[21] Appl. No.: 08/999,551

[22] Filed: Dec. 12, 1997

Related U.S. Application Data

[63] Continuation of application No. PCT/JP97/01268, Apr. 11, 1997.

[30]     Foreign Application Priority Data

Apr. 12, 1996   [JP]   Japan .................................. 8-091265

[51] Int. Cl.⁷ .................................................. G10L 15/02
[52] U.S. Cl. ............................................ 702/67; 704/278
[58] Field of Search ............................. 702/67; 345/328; 369/83; 704/278

[56]             References Cited

U.S. PATENT DOCUMENTS

| | | | |
|---|---|---|---|
| 5,151,998 | 9/1992 | Capps ....................................... | 395/800 |
| 5,204,969 | 4/1993 | Capps et al. ............................ | 395/800 |
| 5,404,316 | 4/1995 | Klingler et al. ......................... | 364/514 |
| 5,758,180 | 5/1998 | Duffy et al. ............................. | 395/806 |
| 5,760,767 | 6/1998 | Shore et al. ............................. | 345/328 |
| 5,781,188 | 7/1998 | Amiot et al. ............................. | 345/328 |
| 5,781,435 | 7/1998 | Holroyd et al. ......................... | 364/192 |
| 5,792,971 | 8/1998 | Timis et al. .............................. | 84/609 |
| 5,818,436 | 10/1998 | Imai et al. ............................... | 345/302 |
| 5,832,441 | 11/1998 | Aaron et al. ............................ | 704/276 |
| 5,838,938 | 11/1998 | Morgan .................................... | 395/328 |
| 5,859,641 | 1/1999 | Cave ........................................ | 345/348 |
| 5,874,952 | 2/1999 | Morgan .................................... | 345/328 |
| 5,886,692 | 3/1999 | Brewer et al. ........................... | 345/328 |
| 5,889,514 | 3/1999 | Boezeman et al. ...................... | 345/302 |
| 5,892,507 | 4/1999 | Moorby et al. .......................... | 345/302 |
| 5,930,446 | 7/1999 | Kanda ...................................... | 386/52 |

FOREIGN PATENT DOCUMENTS

| | | |
|---|---|---|
| 61-45299 | 3/1986 | Japan . |
| 3-192590 | 8/1991 | Japan . |
| 8-76747 | 3/1996 | Japan . |

*Primary Examiner*—Patrick Assouad
*Attorney, Agent, or Firm*—Frommer Lawrence & Haug, LLP.; William S. Frommer

[57]              ABSTRACT

A method for selecting a range of an information signal comprises the steps of detecting the area in which the information signal is specified among a plurality of range-specifying areas displayed on a display device and selecting the information signal range in a unit of the information signal determined in accordance with the range-specifying area in which the specification is executed. The unit of information signal to be selected is different according to which area is selected, so that at least two units of information signal are available for selection.

26 Claims, 6 Drawing Sheets

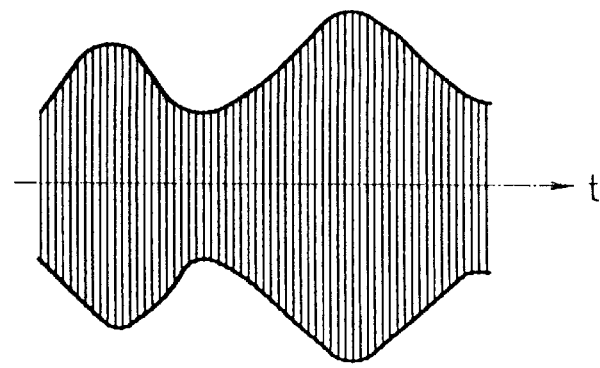
FIG. 3A ENVELOPE SIGNAL Se
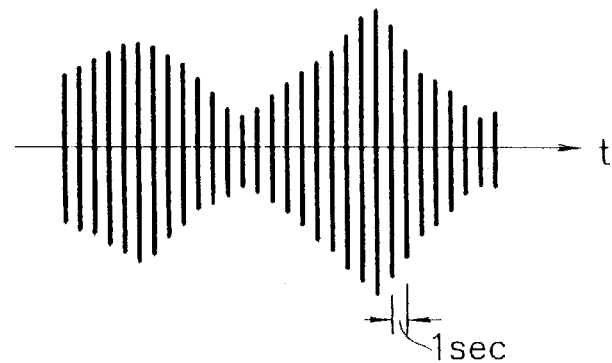
FIG. 3B THINNED-OUT WAVEFORM (DISPLAY WAVEFORM) Sf
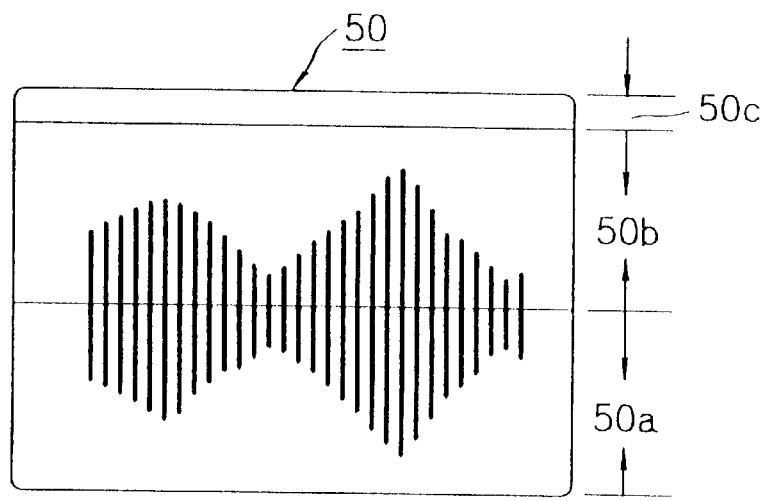
FIG. 4

METHOD AND APPARATUS FOR SELECTING INFORMATION SIGNAL RANGE AND EDITING APPARATUS FOR INFORMATION SIGNAL

This is a continuation of copending International Application PCT/JP97/01268 having an international filing date of Apr. 11, 1997.

TECHNICAL FIELD

The present invention relates to a method and an apparatus for selecting a range of an information signal, such as an audio signal, and an information-signal editing apparatus which concretizes its selecting method. In more detail, this invention relates to the information-signal selecting method or the like which makes it possible to select at least two kinds of information signal units on a display screen by dividing the display screen into a plurality of selectable areas and defining the unit of information signal in terms of the dragged range by the mouse, the minimum edit unit, or as such in accordance with the selected area.

BACKGROUND ART

For a signal processing apparatus such as an audio work station (editing apparatus) having GUI (Graphic User Interface), there is an operation of selecting a range for an information signal such as a audio data to be edited, which is indispensable to the work station having GUI. Usually, after a processing range has been specified, an editing process, such as deletion and copy of that portion, is carried out. As mentioned below, several (for example, three) specifying methods have heretofore been adopted to specify the processing range.

(1) Specify a range (whose position is specified by marks) between two points predetermined by a jog or the like.

(2) Specify the entire recorded portion (minimum edit unit (track)), a portion cut out by editing, a sub-file to be edited, the entire file, and the like.

(3) Specify an arbitrary range by dragging a mouse, based on waveform data displayed on the GUI.

Though the conventional signal processing apparatus requires several kinds of specifying methods as described above when the range for the audio data and the like, to be edited, is specified (specifying the range to be selected), some lower-grade types of editing apparatuses can support only one specifying method. Recently, aforementioned several kinds of specifying methods are prepared and used with changing the processing-range specifying mode properly according to editing process.

Accordingly, in order to change the processing-range specifying method from the above-mentioned specifying method (1), for example, to the specifying method (2), cancel or suspend the specifying method (1) once and select the specifying method (2). In this way, it is inconvenient to specify the range for the audio data and it takes too much time for editing.

The present invention therefore provides a method and an apparatus for selecting the information signal range and an information-signal editing apparatus which have solved the problems of the prior art and make it possible to carry out an occasional specification of these processing ranges on one screen without changing the range-specifying modes.

DISCLOSURE OF THE INVENTION

A method for selecting a range of an information signal in accordance with the first invention comprises the steps of detecting the area in which the information signal is specified among a plurality of range-specifying areas displayed on a display device, and selecting the information signal range in a unit of the information signal determined in accordance with the range-specifying area in which the specification is executed.

An apparatus for selecting a range of an information signal in accordance with the second invention comprises a display means for displaying a plurality of range-specifying areas, a specifying means for specifying the information signal range on the display means, a detecting means for detecting the area in which the information signal range is specified among a plurality of range-specifying areas displayed on the display means by the specifying means, and a selecting means for selecting the information signal range in a unit of the information signal determined in accordance with the range-specifying area in which the specification is executed.

An editing apparatus for editing an information signal in accordance with the third invention comprises a storage means for storing the information signal, a display means for displaying a plurality of range-specifying areas, a specifying means for specifying the information signal range on the display means, a detecting means for detecting the area in which the information signal range is specified among a plurality of range-specifying areas displayed on the display means by the specifying means, a selecting means for selecting the information signal range in a unit of the information signal determined in accordance with the range-specifying area in which the specification is executed, and a means for carrying out an editing process for the information signal in the range selected by the selecting means.

In the first invention, one screen is divided into a plurality of range-specifying areas. When a specific area is specified by a mouse or the like, a processing-range specifying mode associated with the specified area is automatically selected.

When a margin area is specified, a range between two preselected marks is designated as a processing range and an audio signal related to a bar signal located between two marks becomes an object to be processed.

When a positive area is specified, all audio signals included in a track corresponding to a bar signal (audio signal) displayed on the specified area are designated as a processing range.

When a negative area is specified, an audio signal displayed within a range specified by the mouse is specified as a processing range.

As described above, the range-specifying mode differs according to the position of mouse. Since this range-specifying mode can be selected on the same screen, there is no more inconvenience of specifying mode, such as canceling the range-specifying mode under execution at present in order to re-select another range-specifying mode.

In the second and third inventions, an editing point for a digital audio signal or the like can be easily selected by realizing such a selecting method.

BRIEF DESCRIPTION OF THE DRAWINGS

FIGS. 3A and 3B are waveform charts showing examples of a display waveform of an audio signal.

FIG. 4 is a diagram of a screen wherein a display signal is displayed.

BEST MODE FOR PRACTICING THE INVENTION

A preferred embodiment of a method and an apparatus for selecting an information signal range and an editing apparatus for an information signal in accordance with the present invention, which is applied to an editing apparatus utilized for selecting an audio signal range, will be described in detail with reference to the accompanying drawings.

Generally, the editing apparatus for the audio signal is functioned also as the apparatus for selecting the information signal range. This editing apparatus comprises a storage means for storing the information signal, a display means for displaying a plurality of range-specifying areas, a specifying means for specifying the information signal range on the display means, a detecting means for detecting the area in which the information signal range is specified among a plurality of range-specifying areas displayed on the display means by the specifying means, a selecting means for selecting the information signal range in a unit of the information signal determined in accordance with the range-specifying area in which the specification is executed, and a means for carrying out an editing process for the information signal in the range selected by the selecting means.

Figure 1:
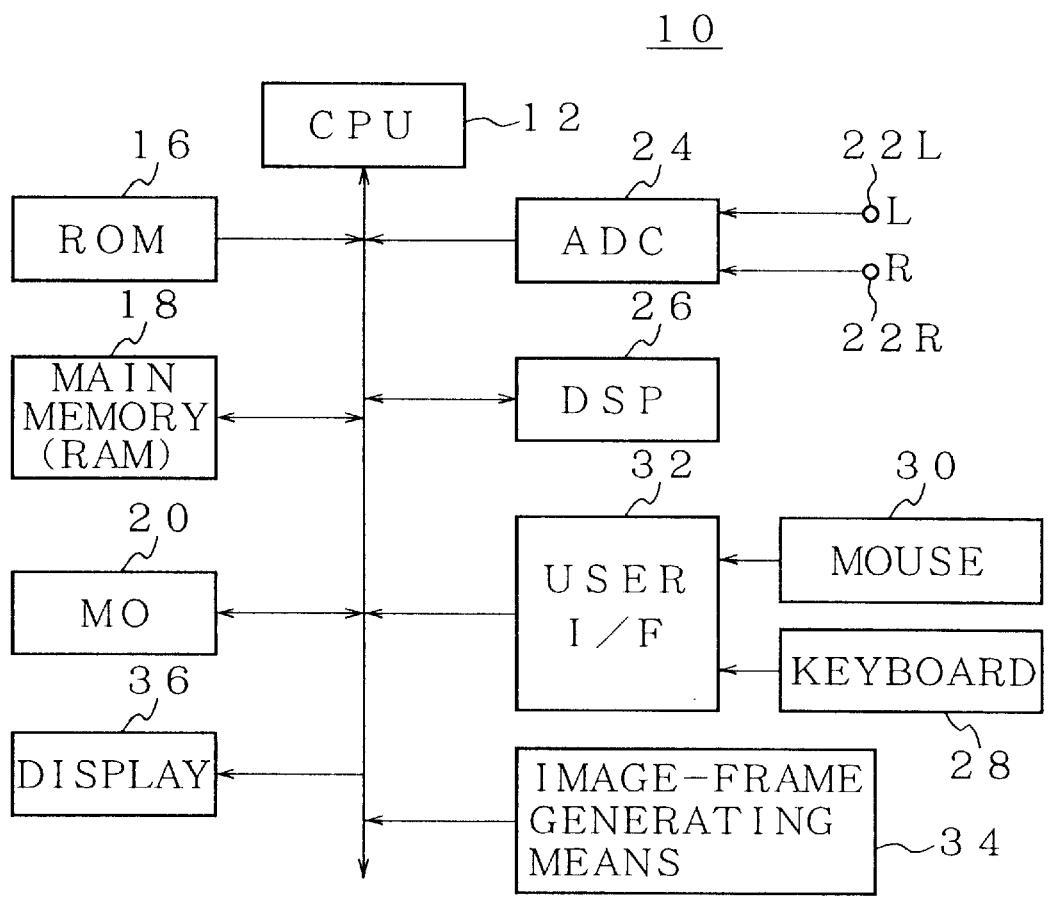
FIG. 1 is a system diagram showing the essential portions of preferred embodiment wherein a processing apparatus in accordance with the present invention is adopted to a digital audio signal editing apparatus.

The embodiment will be described on the basis of editing apparatus for the audio signal. As shown in FIG. 1, this editing apparatus 10 has a CPU 12 for conducting the control of the entire apparatus. Further, the editing apparatus 10 includes a main memory (RAM or the like) 18 serving as a working memory and a memory (ROM) 16 storing programs for executing various controls therein, both of which are connected to the CPU 12 by a bus 14. Moreover, the editing apparatus 10 comprises a recording device 20 with a large recording capacity for recording edit materials (sources) such as audio signals. In this example, a magneto optical disk (MO) drive is used as the recording device 20, so as to be able to perform random access and execute a non-linear editing. A hard disc drive (HDD) or the like may be also used as the recording device 20.

Audio signals of L-channel and R-channel for editing materials, which are respectively supplied to terminals 22L and 22R, are converted into digital signals by an A/D (analog to digital) converter 24. The digital audio signals are once stored in the main memory 18 and then recorded in the recording device 20. Upon editing process, a procedure for displaying necessary audio signals on a display 36 is carried out by a signal processor (DSP) 26. A CRT and a liquid crystal display device can be used as the display 36.

In the present example, a mouse (area-specifying means) 30 and a keyboard 28 are provided to specify a processing range with respect to the audio signals displayed on the display 36. The mouse 30 and keyboard 28 are connected to the CPU 12 by way of a user interface 32. Though an area for specifying the processing range is displayed on the screen as described later, an image-frame generating means 34 is provided to display this area, generating an image frame signal for obtaining an image frame 50 shown in FIG. 4.

Figure 2:
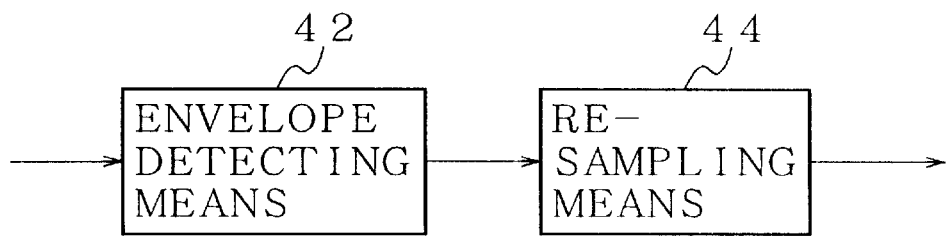
FIG. 2 is a system diagram showing a part of an example of a display signal generating means.

In the signal processor 26, a display signal is generated as shown in FIG. 2. A display signal generating means 40 includes an envelope detecting means 42 and a re-sampling means 44. The audio signals read out from the recording device 20 are once loaded into the main memory 18 and the envelope of the loaded audio signals is detected by the envelope detecting means 42 as shown in FIG. 3A. Subsequently, the audio signals are thinned out by the re-sampling means 44.

In this example, in order to easily and surely specify a range by the envelope, the audio signals are re-sampled, for example, at one-second intervals as shown in FIG. 3B, and the crest values (peak-to-peak values) of the re-sampled detected output are displayed in the form of bars as a display signal (display waveform) Sf. Naturally the envelope waveform can be displayed by bars without thinning out.

In FIG. 3B, both the envelope waveform and the re-sampled display waveform Sf are made, for convenience, to have the same time interval by scale down the time axis of the re-sampled display waveform. Since the process for generating the display signal shown in FIG. 3B is carried out by the signal processor 26, its actual processing is completed by a computer software.

The so-generated display signal is displayed so as to fit in the image frame 50 displayed on the screen of display 36 as shown in FIG. 4. The image frame 50 is a frame for distinguishing the display of display signal Sf from the margin.

Moreover, in the present example, the same screen within the image frame 50 is divided into three areas, which are, with making the center of display signal Sf a boundary line, an area (negative area) 50a wherein a negative value of the display signal Sf is displayed, an area (positive area) 50b wherein a positive value of the display signal Sf is displayed, and a margin area 50c.

The negative area 50a is an area for specifying the display signal Sf located within a range dragged by the mouse 30 as a processing range. In the negative area 50a, an arbitrary range can be specified.

The positive area 50b is an area wherein the display signal Sf is specified in a track-unit, and one or a plurality of tracks displayed within the positive area 50b can be specified. A track(s) can be specified by specifying the displayed waveform. Here, the track is the recorded unit or the minimum unit cut out by editing. A combination of portions arbitrarily cut out from one audio signal is, of course, included in the minimum unit cut out by editing. If it is possible to simultaneously display a plural music as one track within the positive area 50b, the entire music of one among these music can be taken as the minimum unit. The processing range can be specified in a track-unit by utilizing the positive area 50b.

The margin area 50c is an area for specifying a range between two M-marks respectively representing an edit starting point and an edit end point specified by an edit rehearsal. These areas 50a to 50c are specified by a cursor 54 (see FIG. 6) which moves as a pointer in relation to the mouse 30. As a result, the area specified by an operator (user) is determined as described below by an area-determining process program stored in the memory 16 shown in FIG. 1.

Figure 5:
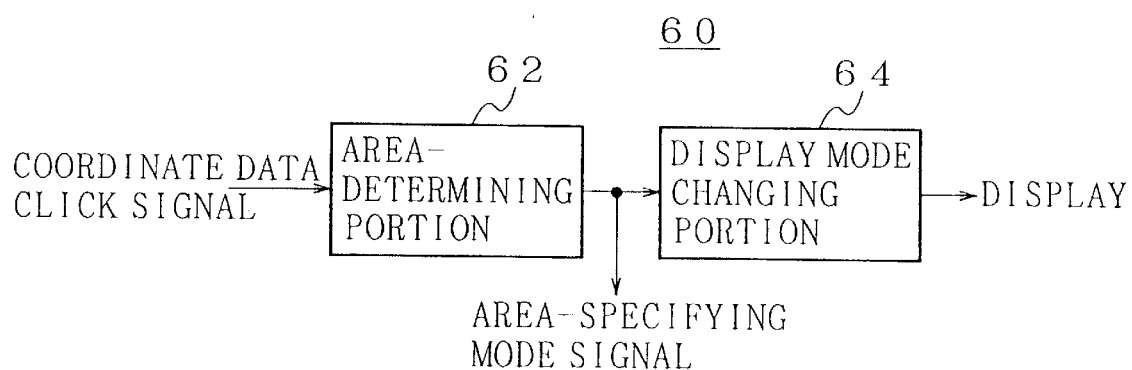
FIG. 5 is a system diagram showing the essential portions of one example of an area-determining means.

For convenience, this will be explained by using an area-determining means 60 shown in FIG. 5. A click signal (including a drag signal) and a coordinate data (of the horizontal direction X and the vertical direction Y) representing the position of cursor 54 are obtained from the mouse 30. The coordinate data and the click signal are supplied to an area-determining portion 62, the area (including a track of display waveform thereof) on the screen where the cursor 54 is located is determined from the coordinate data. Further, by utilizing the click signal, the area-determining portion 62 determines whether the area has been fixed. After fixing the specified area, an area (range) specifying mode signal (coordinate data, click signal, and the like) is sent to the CPU 12 and utilized as an information of edit-processing range and the like.

Moreover, the area-specifying mode signal is supplied to a display mode changing portion (display changing means) 64 and the display mode of the screen only where the range is specified by the cursor 54 is changed. In this example, the display mode of the specified range is changed to a cross-hatching mode. Thus, the specified range can be visually confirmed.

In the following, the area specification by a user, the determination of its corresponding range, and the process of changing the display mode will be described with reference to FIG. 6 and figures following.

(a) Specifying the arbitrary range by dragging the mouse.

Figure 6A:
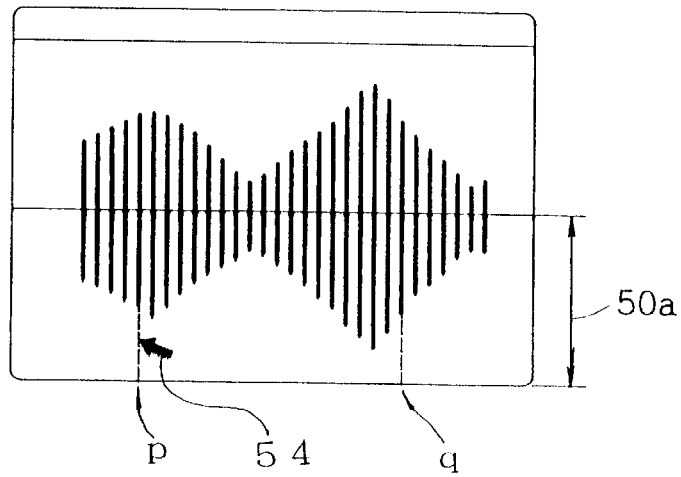
FIGS. 6A and 6B are explanatory diagrams (No. 1) for specifying a processing range.

After moving the cursor 54 in the lower half (negative area) 50a of the screen using the mouse 30 as illustrated in FIG. 6A, the user should place the cursor 54 at an arbitrary starting point p (or end point q) by referring to the waveform data or the like on the screen, press the left mouse button of the mouse 30 until it clicks, and hold it down. Then, the user should move the cursor 54 to the end point q (or starting point p), in the way of dragging a line with holding down the mouse button.

Figure 6B:
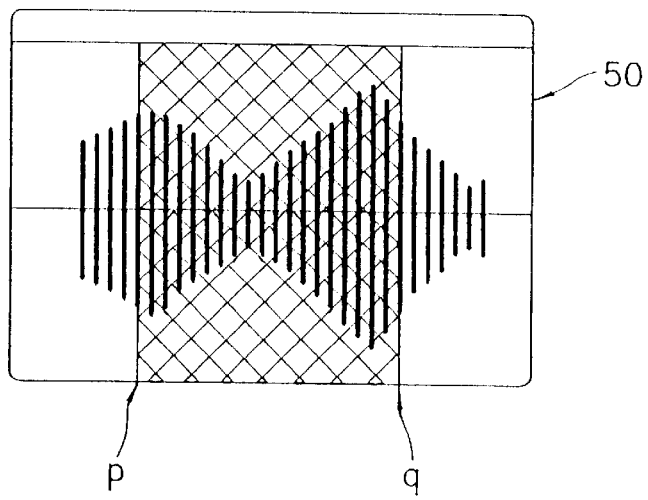

The user should release the mouse button right after placing the cursor 54 at the end point q (or starting point p). This completes the area specification. When the area specification is completed by dragging using the mouse, the inside portion of the range between the specified points p and q is crosshatched on the screen as illustrated in FIG. 6B.

(b) Specifying the entire track T (the entire recorded sounds, a portion cut by editing and the like).

Figure 7A:
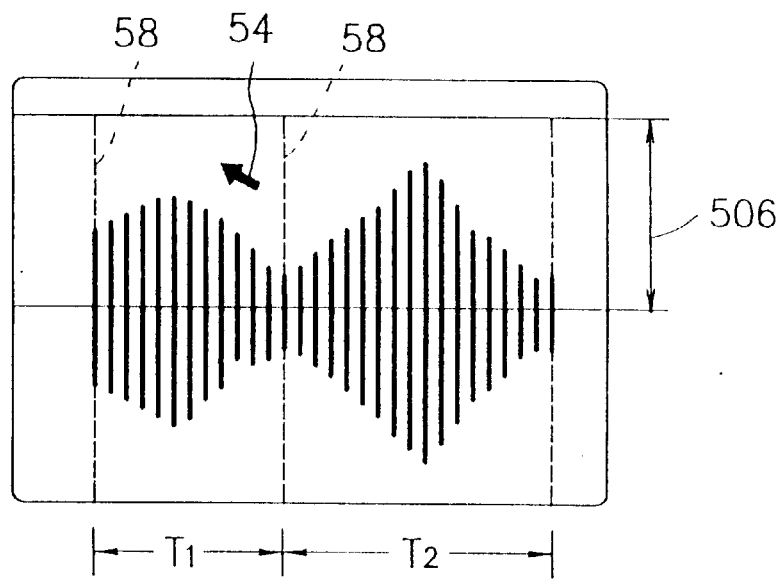
FIGS. 7A to 7C are explanatory diagrams (No. 2) for specifying a processing range.
Figure 7B:
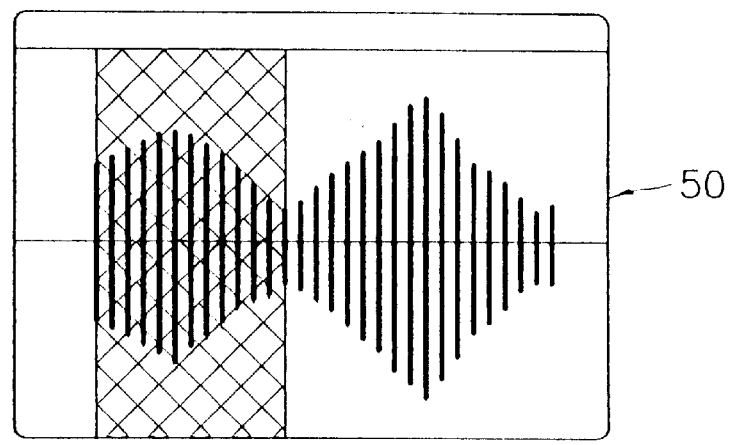

For example, if the upper half (positive area) 50b of a displayed waveform wherein a display signal region of a track T1 is located is clicked by the mouse 30 as shown in FIG. 7A, the entire track T1 is selected and a cross-hatching is overlapped with the display on the screen as shown in FIG. 7B. A process after the area specification is similar to the process taken for FIG. 6. In order to make the position of the track clear, a broken line 58 which is a boundary between two tracks may be displayed simultaneously with the display of the waveform as shown in FIG. 7A.

Figure 7C:
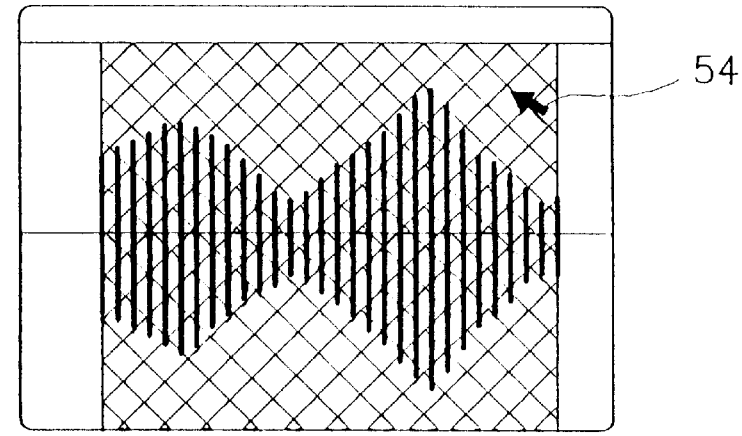

In order to specify both "track T1" and "track T2" shown in FIG. 7A, the user should operate a function key (for example, a CTRL key) and the mouse 30 simultaneously. Because of these operations, the user can select all of the plural tracks T1 and T2 at once (crosshatched portion in FIG. 7C).

(c) Specifying the range between two M-marks.

Figure 8A:
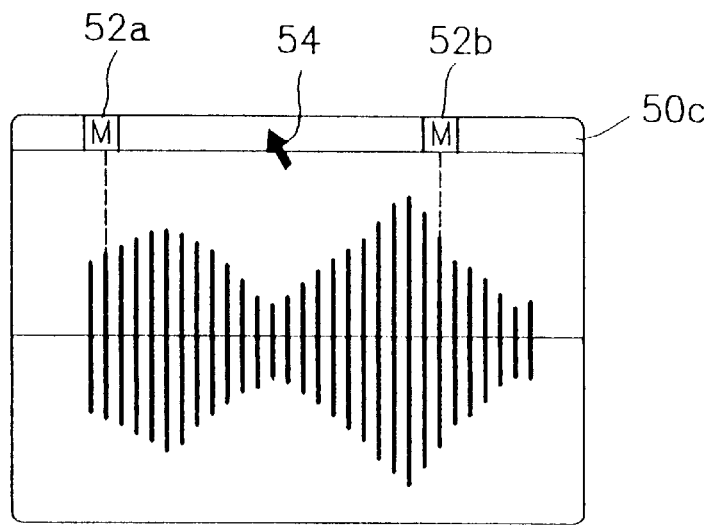
FIGS. 8A and 8B are explanatory diagrams (No. 3) for specifying a processing range.
Figure 8B:
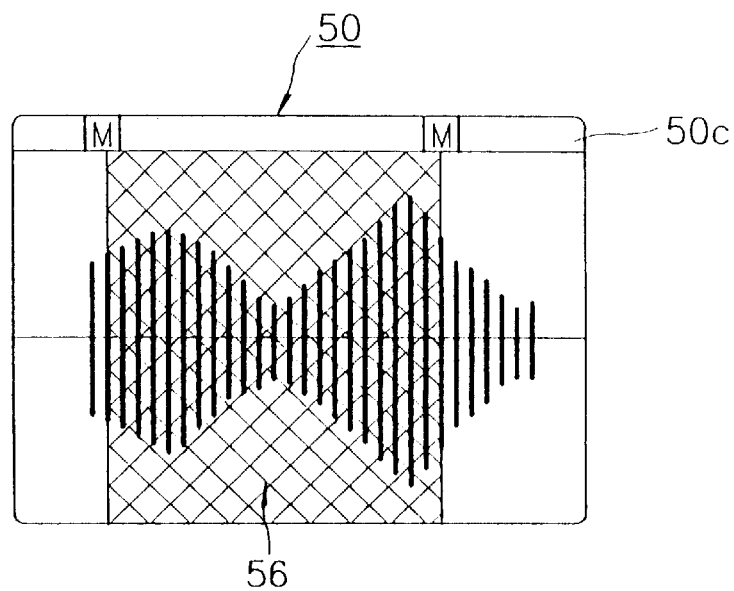

First, by a jog/shuttle or the like, the user should find a starting point and an end point for the place to be edited. At this time, the user should confirm the positions of editing points by operations such as rehearsal. After the confirmation of editing points, two M-marks should be set (see FIG. 8A). Next, the user should click the mouse 30, with keeping the cursor 54 between the two M-marks, within the area 50c wherein the two M-marks are displayed. According to this operation, the predetermined range between the starting point M and the end point M is specified and the display within the specified range is crosshatched as shown in FIG. 8B.

Figure 9:
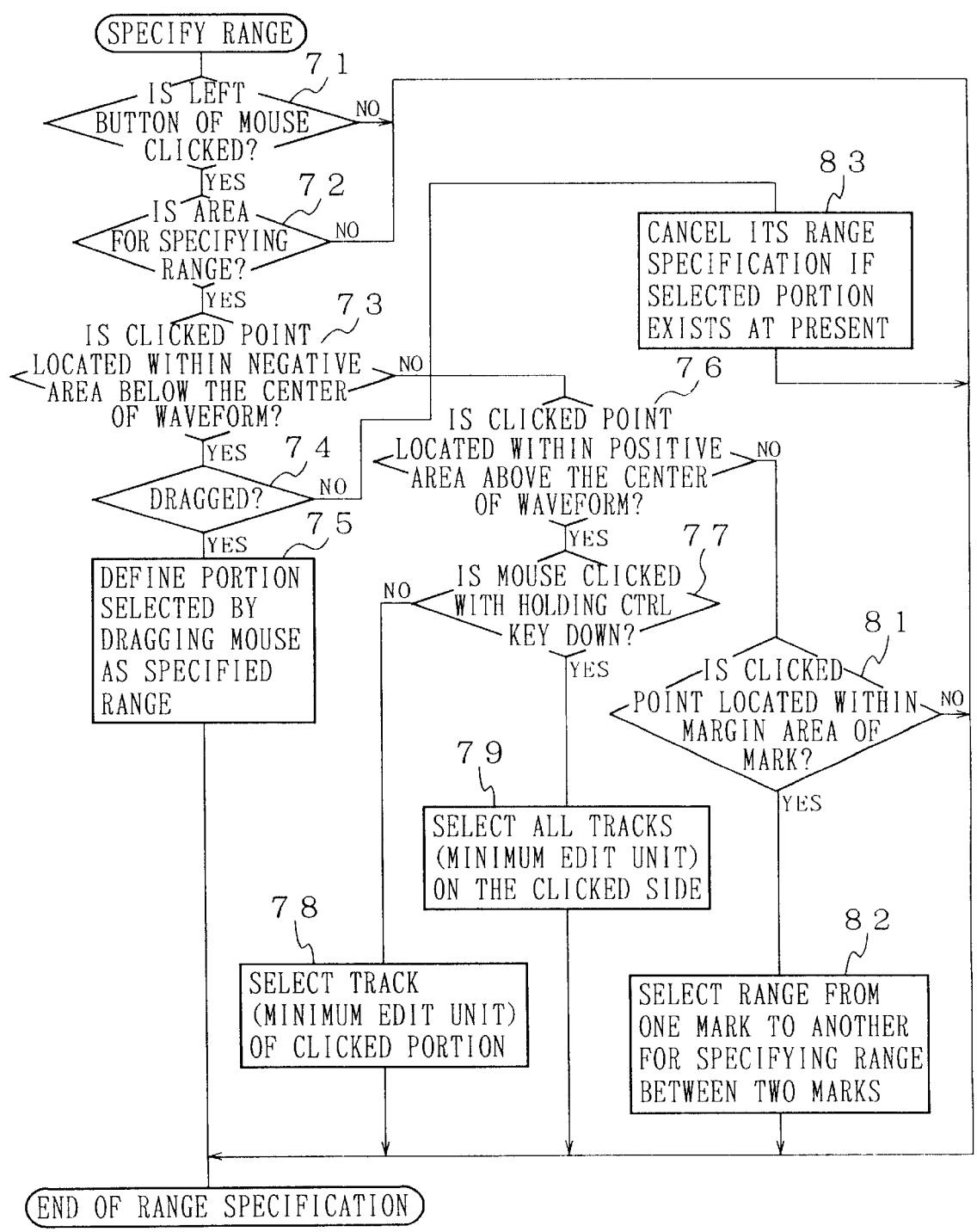
FIG. 9 is a diagram showing an example of a process flowchart for specifying a processing range.

One example of a flowchart for realizing the aforementioned area-specifying operation (processing-range specifying operation) is shown in FIG. 9. If the left click button (left button) (not shown) of the mouse 30 is clicked (step 71), a determination is made, in the area-specifying mode, whether the cursor 54 is located within the area to be area-specified (step 72).

If the place to be clicked is located within the specifying range and also within the negative area 50a below the center of the display waveform Sf, the state of drag is determined (steps 73 and 74). Next, if the mouse 30 is dragged at its position, the portion selected by dragging the mouse 30 is defined as an area-specifying range (step 75). This is a specifying example for FIG. 6.

If the mouse is not dragged in spite of being in the negative area 50a, the area specification is canceled (step 83). Therefore, if any portion has been selected at present, the portion is treated as a no area-specified portion.

If the clicked portion is located in the positive area 50b above the center of the display waveform Sf (step 76), it is determined whether the mouse 30 is clicked with holding a specific function key (CTRL key in the present example) down (step 77). If the mouse 30 is clicked without holding the CTRL key down, a track (the above-mentioned minimum edit unit) including the clicked portion (a portion where the cursor 54 is located) is selected as a processing area (step 78). This is a specifying example for FIG. 7B.

If the mouse 30 is clicked with holding the CTRL key down, all the tracks on the clicked side are selected as a specified area (step 79). This is an example for FIG. 7C.

If it is determined, in step 76, that the area specification is made outside the waveform display area, a determination is made whether the clicked position is within the margin area 50c (step 81). If so, the range between the two M-marks is specified as a processing area (step 82). This is an example for FIG. 8.

The specifying operation for processing area is completed by specifying the processing area as shown in steps 75, 78, and 82.

Thus, the plural specifying modes for processing area different to each other can be specified on the same screen without releasing the present specifying mode.

According to the present invention, even when another area-specifying mode is desired to be selected in place of the present area-specifying mode, a different area-specifying mode can be selected by simply re-specifying the area on the screen without changing or pausing the area-specifying mode under execution at present. As a result, the specification of the processing range becomes extremely simple and a smooth environment for editing operation can be created. Correspondingly, the entire editing operation can be improved in efficiency and shortened in time.

INDUSTRIAL APPLICABILITY

The present invention can be applied to an editing apparatus which non-linearly edits an information signal such as a digital audio signal.

What is claimed is:

1. A method for selecting an editing range mode for specifying a range of an information signal to be edited, said information signal being displayed on a display device comprised of a plurality of range-specifying areas, said method comprising the steps of:

- detecting the range-specifying area of said display device in which a selecting cursor is currently located; and
- selecting a range of said information signal for editing in accordance with the detected range-specifying area.

2. The method according to claim 1 wherein:

said plurality of range-specifying areas includes at least first and second range-specifying areas; and said step of selecting a range is further comprised of:
- selecting said information signal in an arbitrarily specified range when the detected range-specifying area is said first range-specifying area, and
- selecting a predetermined unit of said information signal when the detected range-specifying area is said second range-specifying area.

3. The method according to claim 2 wherein the predetermined unit of said information signal to be selected is a minimum edit unit when said detecting step detects that said range specification is executed within said second range-specifying area.

4. The method according to claim 3 wherein:

said information signal is generated by cutting out a portion from at least one information signal source and combining therewith; and said minimum edit unit is said information signal source of said cut-out portion.

5. The method according to claim 2 wherein:

said plurality of range-specifying areas further includes a third range-specifying area; and when the detected range-specifying area is said third range-specifying area, said selecting step selects said information signal lying between preselected edit points, said edit points being located at the beginning and the end of a previously specified range.

6. The method according to claim 1 wherein:

a waveform diagram of said information signal is displayed on the screen of said display device; and said plural range-specifying areas adjoin each other in the direction perpendicular to the time axis.

7. The method according to claim 2 wherein:

a waveform of said information signal is displayed on the screen of said display device; and said first and second range-specifying areas are located in the waveform diagram of said information signal and adjoin each other in the direction perpendicular to the time axis.

8. The method according to claim 7 wherein:

said first range-specifying area corresponds to the upper half of the waveform diagram, which is the positive portion of said information signal; and said second range-specifying area corresponds to the lower half of the waveform diagram, which is the negative portion of said information signal.

9. The method according to claim 7 wherein said information signal is an audio signal.

10. The method according to claim 1 further including the step of changing the mode of displaying a waveform diagram of said information signal corresponding to said information signal range selected by said selecting step.

11. An apparatus for selecting a range of an information signal comprising:

- a display means for displaying a plurality of range-specifying areas;
- a specifying means for specifying said information signal range on said display means;
- a detecting means for detecting the area in which said information signal range is specified among a plurality of range-specifying areas displayed on said display means by said specifying means; and
- a selecting means for selecting said information signal range in a unit of said information signal determined in accordance with said range-specifying area in which said specification is executed.

12. The apparatus according to claim 11 wherein:

said range-specifying area includes at least first and second range-specifying areas; and said selecting means selects said information signal in an arbitrarily specified range when said detecting means detects that said range specification is executed within said first range-specifying area and selects a predetermined unit of said information signal that contains a specified range when said detecting means detects that said range specification is executed within said second range-specifying area.

13. The apparatus according to claim 12 wherein the predetermined unit of said information signal to be selected is a minimum edit unit when said detecting means detects that said range specification is executed within said second range-specifying area.

14. The apparatus according to claim 13 wherein:

said information signal is generated by cutting out a portion from at least one information signal source and combining therewith; and said minimum edit unit is said information signal source of said cut-out portion.

15. The apparatus according to claim 12 wherein:

said range-specifying area further includes a third range-specifying area; and when said detecting means detects that said range specification is executed within said third range-specifying area, said selecting means selects said information signal lying in between the preselected edit points located at the beginning and the end of said specified range.

16. The apparatus according to claim 11 wherein:

a waveform diagram of said information signal is displayed on the screen of said display means; and said plural range-specifying areas adjoin each other in the direction perpendicular to the time axis.

17. The apparatus according to claim 12 wherein:

a waveform of said information signal is displayed on the screen of said display means; and said first and second range-specifying areas are located in the waveform diagram of said information signal and adjoin each other in the direction perpendicular to the time axis.

18. The apparatus according to claim 17 wherein:

said first range-specifying area corresponds to the upper half of the waveform diagram, which is the positive portion of said information signal; and said second range-specifying area corresponds to the lower half of the waveform diagram, which is the negative portion of said information signal.

19. The apparatus according to claim 17 wherein said information signal is an audio signal.

20. The apparatus according to claim 11 further including a display changing means for changing the mode of displaying a waveform diagram of said information signal corresponding to said information signal range selected by said selecting means.

21. The apparatus according to claim 11 wherein said specifying means controls said display means so as to display a pointer on said display means and outputs coordinate information on the position of said pointer to said detecting means.

22. The apparatus according to claim 21 wherein said specifying means includes a first button and outputs a signal indicating whether said first button is clicked to said detecting means and said selecting means.

23. An editing apparatus for editing an information signal comprising:

a storage means for storing said information signal;

a display means for displaying a plurality of range-specifying areas;

a specifying means for specifying said information signal range on said display means;

a detecting means for detecting the area in which said information signal range is specified among a plurality of range-specifying areas displayed on said display means by said specifying means;

a selecting means for selecting said information signal range in a unit of said information signal determined in accordance with said range-specifying area in which said specification is executed; and a means for carrying out an editing process for said information signal in the range selected by said selecting means.

24. The apparatus according to claim 23 wherein:

said range-specifying area includes at least first and second range-specifying areas; and said selecting means selects said information signal in an arbitrarily specified range when said detecting means detects that said range specification is executed within said first range-specifying area and selects a predetermined unit of said information signal that contains a specified range when said detecting means detects that said range specification is executed within said second range-specifying area.

25. The apparatus according to claim 24 wherein:

a waveform of said information signal is displayed on the screen of said display means; and said first and second range-specifying areas are located in the waveform diagram of said information signal and adjoin each other in the direction perpendicular to the time axis.

26. The apparatus according to claim 25 wherein said information signal is an audio signal.

* * * * *